(12) United States Patent
Matityahu et al.

(10) Patent No.: US 9,806,968 B2
(45) Date of Patent: Oct. 31, 2017

(54) INTEGRATED NETWORK DATA COLLECTION ARRANGEMENT AND METHODS THEREOF

(75) Inventors: Eldad Matityahu, Palo Alto, CA (US); Robert Shaw, Los Gatos, CA (US); Dennis Carpio, San Jose, CA (US); Sharon Besser, Santa Clara, CA (US)

(73) Assignee: IXIA, Calabasas, CA (US)

( * ) Notice: Subject to any disclaimer, the term of this patent is extended or adjusted under 35 U.S.C. 154(b) by 0 days.

(21) Appl. No.: 13/092,671

(22) Filed: Apr. 22, 2011

(65) Prior Publication Data

US 2011/0264797 A1    Oct. 27, 2011

Related U.S. Application Data

(60) Provisional application No. 61/327,619, filed on Apr. 23, 2010.

(51) Int. Cl.
*G06F 15/173* (2006.01)
*H04L 12/26* (2006.01)

(52) U.S. Cl.
CPC .............. *H04L 43/04* (2013.01); *H04L 43/06* (2013.01); *H04L 43/12* (2013.01); *H04L 43/026* (2013.01)

(58) Field of Classification Search
CPC ....... H04L 43/04; H04L 43/06; H04L 43/026; H04L 43/12
USPC ................................. 709/223, 224, 225, 226
See application file for complete search history.

(56) References Cited

U.S. PATENT DOCUMENTS

| 5,343,473 | A | 8/1994 | Cidon et al. |
| 5,867,763 | A | 2/1999 | Dean et al. |
| 6,130,887 | A | 10/2000 | Dutta |
| 6,505,255 | B1 | 1/2003 | Akatsu et al. |
| 6,678,250 | B1 * | 1/2004 | Grabelsky ............... H04L 43/06 370/241 |
| 6,814,510 | B1 * | 11/2004 | Sabbagh ............... G06F 3/1204 400/61 |
| 6,907,001 | B1 | 6/2005 | Nakayama et al. |
| 7,286,652 | B1 | 10/2007 | Azriel et al. |
| 7,424,018 | B2 | 9/2008 | Gallatin et al. |
| 7,515,650 | B1 | 4/2009 | Warner et al. |
| 7,596,356 | B2 | 9/2009 | Rofougaran et al. |

(Continued)

OTHER PUBLICATIONS

"International Search Report", PCT Application No. PCT/US2011/033313, dated Nov. 30, 2011.

(Continued)

*Primary Examiner* — Dhairya A Patel
(74) *Attorney, Agent, or Firm* — Jenkins, Wilson, Taylor & Hunt P.A.

(57) ABSTRACT

An arrangement for storing data pertaining to network data traffic flowing through a network is provided. The arrangement includes a set of network cluster arrangements. Each network cluster arrangement of the set of network cluster arrangements includes a plurality of network devices configured for receiving and sending the network data traffic, and a set of monitoring network appliances configured for monitoring at least a portion of the network data traffic flowing between the plurality of network devices. The arrangement also includes a set of network data collection arrangements configured for at least storing the data pertaining to the network data traffic.

16 Claims, 9 Drawing Sheets

(56) References Cited

U.S. PATENT DOCUMENTS

| | | | | |
|---|---|---|---|---|
| 7,873,702 | B2* | 1/2011 | Shen | G06F 11/2038 709/218 |
| 7,945,216 | B2 | 5/2011 | Rakshani et al. | |
| 8,098,677 | B1 | 1/2012 | Pleshek et al. | |
| 8,102,783 | B1* | 1/2012 | Narayanaswamy | H04L 43/18 370/252 |
| 8,134,927 | B2 | 3/2012 | Gamage et al. | |
| 8,248,928 | B1 | 8/2012 | Wang et al. | |
| 8,306,063 | B2* | 11/2012 | Erdal | H04L 29/06027 370/474 |
| 8,386,937 | B1 | 2/2013 | Gao et al. | |
| 8,446,916 | B2 | 5/2013 | Aybay et al. | |
| 9,270,542 | B2 | 2/2016 | Gamage et al. | |
| 9,571,296 | B2 | 2/2017 | Nachum | |
| 2002/0073136 | A1 | 6/2002 | Itoh et al. | |
| 2003/0144868 | A1* | 7/2003 | MacIntyre | G06F 17/30536 705/7.38 |
| 2003/0172123 | A1 | 9/2003 | Polan et al. | |
| 2004/0015613 | A1 | 1/2004 | Ikeda | |
| 2005/0282502 | A1 | 12/2005 | Kursula et al. | |
| 2006/0174032 | A1 | 8/2006 | Winchester et al. | |
| 2006/0223516 | A1 | 10/2006 | Fan et al. | |
| 2006/0294221 | A1* | 12/2006 | Graupner | H04L 43/067 709/224 |
| 2007/0189272 | A1 | 8/2007 | Hutchinson et al. | |
| 2008/0052784 | A1 | 2/2008 | Wiley et al. | |
| 2008/0147831 | A1 | 6/2008 | Redjaian et al. | |
| 2008/0153541 | A1 | 6/2008 | Rakshani et al. | |
| 2008/0170561 | A1 | 7/2008 | Halbraich et al. | |
| 2008/0190639 | A1 | 8/2008 | Baran et al. | |
| 2008/0215477 | A1 | 9/2008 | Annunziata | |
| 2009/0182874 | A1* | 7/2009 | Morford | H04L 41/5025 709/224 |
| 2009/0190589 | A1 | 7/2009 | Bains et al. | |
| 2010/0135164 | A1 | 6/2010 | Rofougaran | |
| 2010/0228854 | A1* | 9/2010 | Morrison | H04L 29/00 709/224 |
| 2011/0026406 | A1 | 2/2011 | Gamage et al. | |
| 2011/0026521 | A1 | 2/2011 | Gamage et al. | |
| 2011/0103259 | A1 | 5/2011 | Aybay et al. | |
| 2011/0103595 | A1* | 5/2011 | Ramaswamy | H04R 29/00 381/56 |
| 2011/0264797 | A1* | 10/2011 | Matityahu | H04L 43/04 709/224 |
| 2012/0124257 | A1 | 5/2012 | Wu | |
| 2012/0181540 | A1 | 7/2012 | Udagawa et al. | |
| 2012/0317224 | A1 | 12/2012 | Caldwell et al. | |
| 2013/0010605 | A1 | 1/2013 | Jocha et al. | |
| 2013/0272135 | A1 | 10/2013 | Leong | |
| 2013/0336240 | A1 | 12/2013 | Cherian et al. | |
| 2014/0012962 | A1 | 1/2014 | Formby et al. | |
| 2014/0181267 | A1 | 6/2014 | Wadkins et al. | |
| 2015/0009994 | A1 | 1/2015 | Keesara et al. | |
| 2015/0029846 | A1 | 1/2015 | Liou et al. | |
| 2015/0055720 | A1 | 2/2015 | Lin et al. | |
| 2015/0113133 | A1 | 4/2015 | Srinivas et al. | |
| 2015/0113143 | A1 | 4/2015 | Stuart et al. | |
| 2015/0319049 | A1 | 11/2015 | Nachum | |
| 2015/0319070 | A1 | 11/2015 | Nachum | |
| 2016/0057039 | A1 | 2/2016 | Htay et al. | |
| 2016/0226752 | A1 | 8/2016 | Gamage et al. | |

OTHER PUBLICATIONS

"Written Opinion", PCT Application No. PCT/US2011/033313, dated Nov. 30, 2011.

P/12 Final Office Action for U.S. Appl. No. 14/266,668 (dated Aug. 25, 2016).

Final Office Action for U.S. Appl. No. 13/933,838 (dated May 19, 2016).

Non-Final Office Action for U.S. Appl. No. 13/933,838 (dated Sep. 24, 2015).

Selecting the Right VERAstreamTM Product, Datacom Systems Inc, p. 1-1 (May 14, 2013).

Notice of Allowance for U.S. Appl. No. 14/266,660 (dated May 13, 2016).

Non-Final Office Action for U.S. Appl. No. 14/266,668 (dated Feb. 1, 2016).

Commonly-assigned, co-pending U.S. Appl. No. 15/012,801 for "Apparatus and Methods for Forwarding Data Packets Captured from a Network," (Unpublished, filed Feb. 1, 2016).

Notice of Allowance for U.S. Appl. No. 14/266,660 (dated Jan. 21, 2016).

Extended European Search Report for European Patent Application No. 11772665.3 (dated Oct. 1, 2015).

Non-Final Office Action for U.S. Appl. No. 14/266,660 (dated Sep. 18, 2015).

Notice of Allowance and Fee(s) Due and Examiner-Initiated Interview Summary for U.S. Appl. No. 12/533,957 (dated Aug. 7, 2015).

Non-Final Office Action for U.S. Appl. No. 12/533,957 (dated Nov. 17, 2014).

Final Office Action for U.S. Appl. No. 12/533,957 (dated Feb. 28, 2014).

Interview Summary for U.S. Appl. No. 12/533,957 (dated Jan. 24, 2014).

"OpenFlow Switch Specification," Open Networking Foundation, Version 1.4.0 (Wire Protocol 0x05), pp. 1-206 (Oct. 14, 2013).

Non-Final Office Action for U.S. Appl. No. 12/533,957 (dated Sep. 12, 2013).

Final Office Action for U.S. Appl. No. 12/533,957 (dated Jan. 2, 2013).

Non-Final Office Action for U.S. Appl. No. 12/533,957 (dated May 11, 2012).

"Smart Taps Getting Smarter," Networking, Network Computing New, http://www.networkcomputing.com/networking/smart-taps-getting-smarter/1797861399, pp. 1-2 (Mar. 22, 2012).

"Command Today's Complex Data Center Challenges," Data Center, Net Optics Data Sheet, Net Optics Inc., pp. 1-4 (2011).

Notice of Allowance and Fee(s) Due for U.S. Appl. No. 12/533,951 (dated Nov. 8, 2011).

Final Office Action for U.S. Appl. No. 12/533,957 (dated Oct. 31, 2011).

Interview Summary for U.S. Appl. No. 12/533,957 (dated Aug. 31, 2011).

Non-Final Office Action for U.S. Appl. No. 12/533,957 (dated Aug. 2, 2011).

Interview Summary for U.S. Appl. No. 12/533,951 (dated Jul. 28, 2011).

Non-Final Office Action for U.S. Appl. No. 12/533,951 (dated Feb. 18, 2011).

Agilent Technologies, "Agilent N2X: The Industry's Most Comprehensive Multiservices Test Solution for Converging Network Infrastructures," 5989-1244EN, pp. 1-6 (Feb. 1, 2006).

Agilent Technologies, "Agilent N2X PITV Quality of Experience Test Solution," N5570A and E7877A Technical Data Sheet, 5989-3440EN, pp. 1-12 (Jul. 21, 2006).

Agilent Technologies, "True Router Performance Testing: Agilent Technologies Router Tester Application Note," 5980-1421E, Rev. A, pp. 1-8 (May 2000).

Letter from Ixia to Agilent Technologies re: Notice of Indemnification Claims/Dispute pp. 1-2 (Nov. 9, 2010).

Letter from Agilent Technologies to Ixia re: Notice of Indemnification Claims/Dispute, pp. 1-2 (Oct. 28, 2010).

Letter from Ixia to Agilent Technologies re Notice of Erroneously Assigned Patent Applications and Request for Executed Assignment, pp. 1-2 (Oct. 22, 2010).

Letter from Agilent Technologies to Ixia re: Notice of Erroneously Assigned Patent Application and Request for Executed Assignment, pp. 1-2 (Oct. 8, 2010).

"Radware's Smart IDS Management, FireProof and Intrusion Detection System, Deployment and ROI," Radware, Inc. pp. 1-9 (Aug. 21, 2002).

Edwards, "Vulnerabilities of Network Intrusion Detection Systems: Realizing and Overcoming the Risks, the Case for Flow Mirroring," Top Layer Networks, pp. 1-18 (May 1, 2002).

(56) References Cited

OTHER PUBLICATIONS

Notice of Decision from Post-Prosecution Pilot Program (P3) Conference for U.S. Appl. No. 14/266,668 (Dec. 22, 2016).
Non-Final Office Action for U.S. Appl. No. 15/012,801 (dated Dec. 13, 2016).
Non-Final Office Action for U.S. Appl. No. 13/933,838 (dated Dec. 1, 2016).
Notice of Allowance and Fee(s) Due for U.S. Appl. No. 14/266,660 (dated Oct. 13, 2016).
Final Office Action for U.S. Appl. No. 13/933,838 (dated Jun. 22, 2017).
Final Office Action for U.S. Appl. No. 15/012,801 (dated Jun. 2, 2017).
Non-Final Office Action for U.S. Appl. No. 14/266,668 (dated May 5, 2017).

* cited by examiner

EXAMPLE OF A PACKET PAYLOAD (402) – EMIT COLUMN = 1

404 — _page 1-3
406 — _time 1234567890
408 — _counter_us 1234567890123456
410 {
"redir-01" (36824,987)
"redir-02" (78733898,10987680)
"bal-01" (7898,787)
"bal-02" (7899,786)
"tcp" (978987,56765)
"ingress" (6987080787,637458)
"u1.n1.1.rx" (45325,9877)
"u1.n1.1.tx" (928374,6389)
"u3.t2.2.rx" (739485,5784)
}

EXAMPLE OF A PACKET PAYLOAD (420) – EMIT COLUMN = 3

_page 1-3
426 — _time 1234567890 1234563654 1234560152
428 — _counter_us 1234567890183920 1234567890149028 1234567890108293
430 {
"redir-01" (36824,987) (15243,732) (9784,461)
"redir-02" (78732980,10987680) (78731694,10987385) (78733898,10987188)
"bal-01" (7898,787) (7898,787) (7003,786)
"bal-02" (7899,786) (7806,785) (7806,785)
"tcp" (978987,56765) (9752678,56367) (971957,56174)
"ingress" (6987099235,637836) (6987080787,637458) (6987005342,637166)
"u1.n1.1.rx" (45325,9877) (1678,8171) (0,0)
"u1.n1.1.tx" (928374,6389) (900252,6199) (865266,6032)
"u3.t2.2.rx" (739485,5784) (737577,5478) (732241,5111)
}

FIG. 4A

| Line Header | Contents | Example | Description |
|---|---|---|---|
| 458 _page | <current page>-<total pages> | 1-3 | The traffic statistics are broken into pages (separate UDF packets) to prevent a packet from exceeding the configured MTU size |
| 460 _time | Seconds from the epoch | 1234567890 | Time-of-day timestamp |
| 462 _counter_us | Running microsecond counter | 1234567890183920 | Relative timestamp for data rate calculations |
| 464 "channel name" | (b,p)[t] (b,p)[t-1] (b,p)[t-2]... | (425,97) (18,81) (0,0) | Data point pairs as (byte counter, packet counter), with as many pairs as the value of emit_columns; the newest value comes first; the counters are running, not incremental |

INTEGRATED NETWORK DATA COLLECTION ARRANGEMENT AND METHODS THEREOF

PRIORITY CLAIM

The present invention claims priority under 35 U.S.C. 119(e) to a commonly owned provisionally filed patent application entitled "Integrated Network Data Collection Arrangement And Methods Thereof," US Application No. 61/327,619, filed on Apr. 23, 2010, by inventors Matityahu et al., all of which is incorporated herein by reference.

BACKGROUND OF THE INVENTION

Advances in telecommunication networks have facilitated communication between users who are geographically dispersed. Communication may include transmission of data packets, such as media and voice packets, between a plurality of network devices, such as routers and switches. In a telecommunication-centric society, millions of data packets may be transmitted daily within a single network. To ensure the viability of its network, a company may monitor its network.

Figure 1:
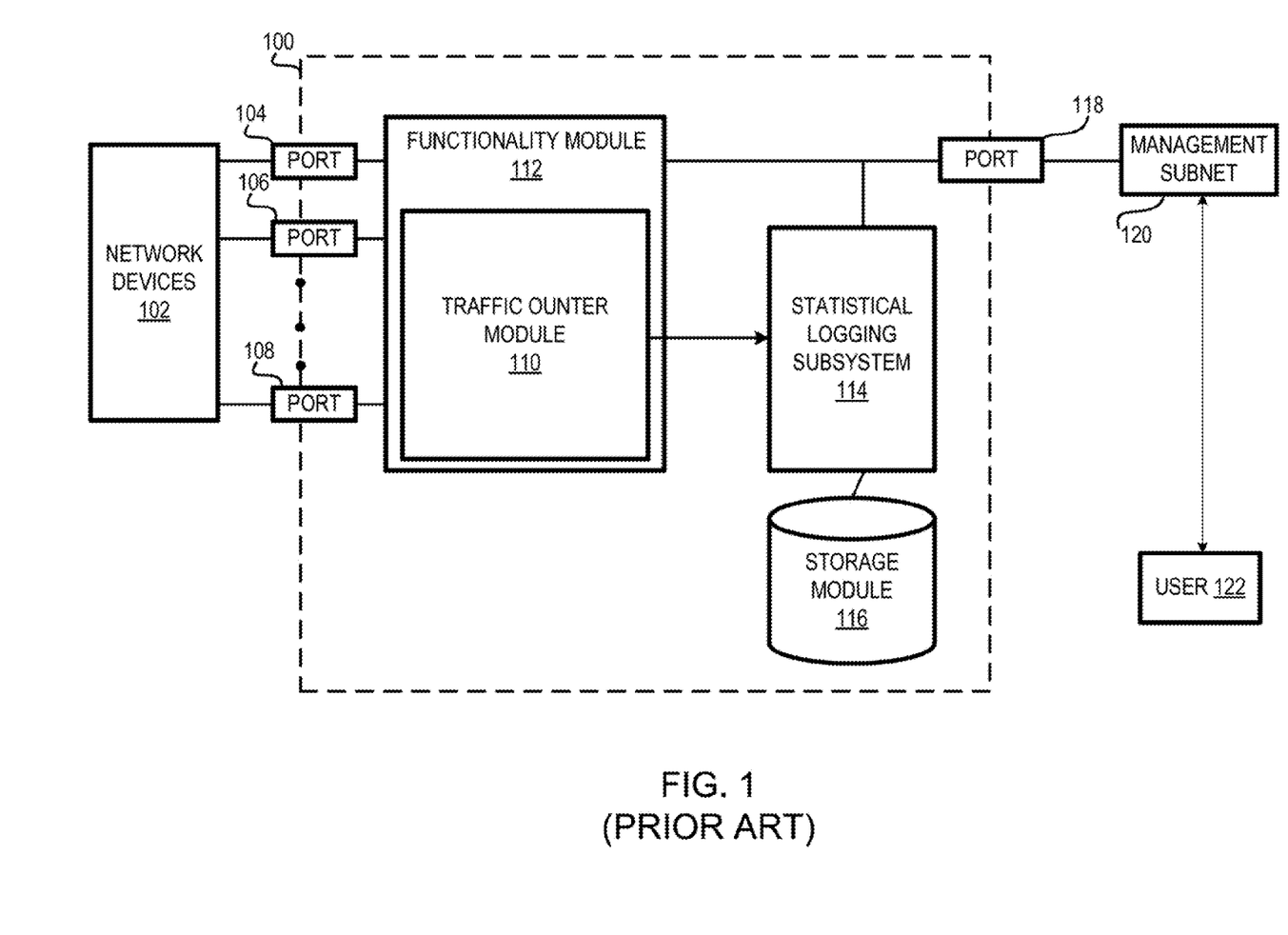
FIG. 1 shows a simple logistical diagram of a monitoring network appliance.

Monitoring may be performed by connecting monitoring network appliances, such as network taps, to the network to gather information about the data traffic. To facilitate discussion, FIG. 1 shows a simple logistical diagram of a monitoring network appliance. Consider the situation wherein, for example, a simple network exists in which data is flowing between a pair of network devices 102 (e.g., routers, switches, endpoints, etc.). To monitor the network data traffic, a monitoring network appliance 100 may be employed. In an example, the data traffic may flow from network device A to network device B via one of the data ports (104, 106, 108, etc.) of monitoring network appliance 100.

Data traffic flowing through monitoring network appliance 100 may be processed by a functionality module 112 before being forwarded to a monitoring tool. The processing capability of monitoring network appliance 100 may vary. In an example, functionality module 112 may be configured to perform switching and filtering. In another example, functionality module 112 may be configured to perform aggregation.

In addition, monitoring network appliance 100 may also include a traffic counter module 110, which may be configured to gather information about the data traffic flowing through monitoring network appliance 100. In an example, information gathered may include the number of bytes, the number of packets, the packet size distribution, and the like.

The data gathered by traffic counter module 110 may then be processed by a statistical logging subsystem 114. In an example, statistical logging subsystem 114 may perform statistical analysis (e.g., calculate average, mean, rates, and the like). Once the data has been processed, the statistical data may be stored within a storage module 116, such as a solid state memory device, a rotating memory device, and the like.

Given the high volume of data that may be gathered and processed, storage module 116 tends to only store real time data. In an example, data from the last five seconds may be stored. All other data is usually discarded. As a result historical data is not available to perform analysis on the data traffic if a problem arises.

In some situation, a user (such as a human user, a management tool, and the like) may request for the statistical data. To request for the data stored on storage module 116, a user 122 may send a request to monitoring network appliance 100 via a management subnet 120. The request may be received by monitoring network appliance 100 via a management port, such as port 118. The request may then be processed by statistical logging subsystem 114. In an example, statistical logging subsystem 114 may analyze the request and retrieve the requested data from storage module 116. The requested data may then be forwarded to user 122 via port 118 and management subnet 120.

As can be appreciated from the aforementioned, a conventional monitoring network appliance usually employs a data pull technique. In other words, the data gathered by traffic counter module 110 and/or processed by statistical logging subsystem 114 is usually not forwarded to an external source unless the data is specifically requested (pull) by a user, such as a management tool. Thus, the data pull technique usually places the burden of pulling the data on the external user. In addition, the data pull technique usually requires higher processor consumption since monitoring network appliance 100 may have to dedicate a portion of its processing power to analyzing and processing the data request.

Another disadvantage of the data pull technique is that the data can only be pulled if user 122 is aware of its existence. In an example, monitoring network appliance is a new network tap device. User 122 is not able to query monitoring network appliance if the user is unaware of the new network tap device (e.g., do not know internet protocol address). As a result, important data may be "lost". In addition, a user, such as user 122, may have to send individual request to each monitoring network appliances, if there is more than one in a network.

Accordingly, an integrated network data collection arrangement for storing and archiving data collected by a plurality of monitoring network appliances is desirable.

BRIEF DESCRIPTION OF THE SEVERAL VIEWS OF THE DRAWINGS

The present invention is illustrated by way of example, and not by way of limitation, in the figures of the accompanying drawings and in which like reference numerals refer to similar elements and in which.

DETAILED DESCRIPTION OF EMBODIMENTS

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Various embodiments are described hereinbelow, including methods and techniques. It should be kept in mind that the invention might also cover articles of manufacture that includes a computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code. Further, the invention may also cover apparatuses for practicing embodiments of the invention. Such apparatus may include circuits, dedicated and/or programmable, to carry out tasks pertaining to embodiments of the invention. Examples of such apparatus include a general-purpose computer and/or a dedicated computing device when appropriately programmed and may include a combination of a computer/computing device and dedicated/programmable circuits adapted for the various tasks pertaining to embodiments of the invention.

In accordance with embodiments of the present invention, a network data collection arrangement and methods thereof are provided. Embodiments of the invention include an integrated solution for storing real-time and historical data from devices within a network environment. Embodiments of the invention also provide for redundancy in data archiving to minimize the possibility of data loss. Embodiments of the invention further provide methods for emitting the statistical data to one or more network data collection arrangement. Embodiments of the invention yet further provide methods for managing the statistical data at the network data collection arrangement(s).

As discussed herein, the term network device may refer to devices that may facilitate the flow of data. Examples of network device may include, but are not limited to, switches, routers, endpoints, and the like.

As discussed herein, the term monitoring tool may refer to devices and/or systems that may be employed to monitor data traffic within a network. Examples of monitoring tools may include, but are not limited to, protocol analyzers, traffic recorders, intrusion detection systems, intrusion prevention system, and the like.

As discussed herein, the term monitoring network device may refer to access device that is capable of copying at least a portion of the data traffic. Examples of monitoring network devices may include, but are not limited to, network taps, director devices, iBypass high density devices, and the like.

In an embodiment of the invention, an integrated solution for storing data about the network data traffic is provided. Consider the situation wherein network data traffic is flowing between two or more network devices (such as routers, switches, endpoints, etc.) within a network cluster arrangement. To monitor the network data traffic, either a single or multiple monitoring network appliances (e.g., such as a network tap) may be employed. The monitored data may then be sent to one or more monitored tools.

In an embodiment, each monitoring network appliance may be configured to gather statistical data about the network data traffic flowing through the network cluster arrangement. The statistical data may be collected by a traffic counter module and/or calculated by a statistical logging subsystem. In an embodiment, the information gathered may then be forwarded through a push data technique to a network data collection arrangement (such as a collection server). As discussed herein, a push data technique is a data technique utilized to pushed data to an external storage medium. The frequency at which the data may be forwarded onward may be predetermined, in an embodiment. In an example, data may be forwarded every one second.

In an embodiment, the data being forwarded may be sent to more than one network data collection arrangement. In an example, the data from a single network cluster arrangement may be stored in one or more network data collection arrangement. In another example, certain type of data (e.g., statistic data about network traffic collected by a traffic counter module) may be stored at a first network data collection arrangement while a different type of data (e.g., calculated statistical data) may be stored at another network data collection arrangement. In yet another example, statistic data collected on a first network device may be stored on a network data collection arrangement that is different than the one storing the data for a second network device. In yet another example, the important data (if lost may prove detrimental to a company) may be stored on two network data collection arrangement to provide redundancy.

In an embodiment, data being stored at a single network data collection arrangement may be coming from more than one network cluster arrangement. To manage the incoming data from one or more network cluster arrangements, each network data collection arrangement may include a data management component for processing the incoming data, a storage module for storing at least portion of the incoming data, and a data request component for managing data request from users.

In an embodiment, the network data collection arrangement may be physically connected to the network. In an example, the network data collection arrangement is locally positioned within the company and shared a wired connection with the company's network. In another embodiment, the network data collection arrangement may be remotely connected to the network. In an example, the network data collection arrangement may be geographically distant from the company's network and may be remotely connected through an Internet or Intranet connection.

The features and advantages of the present invention may be better understood with reference to the figures and discussions that follow.

Figure 2:
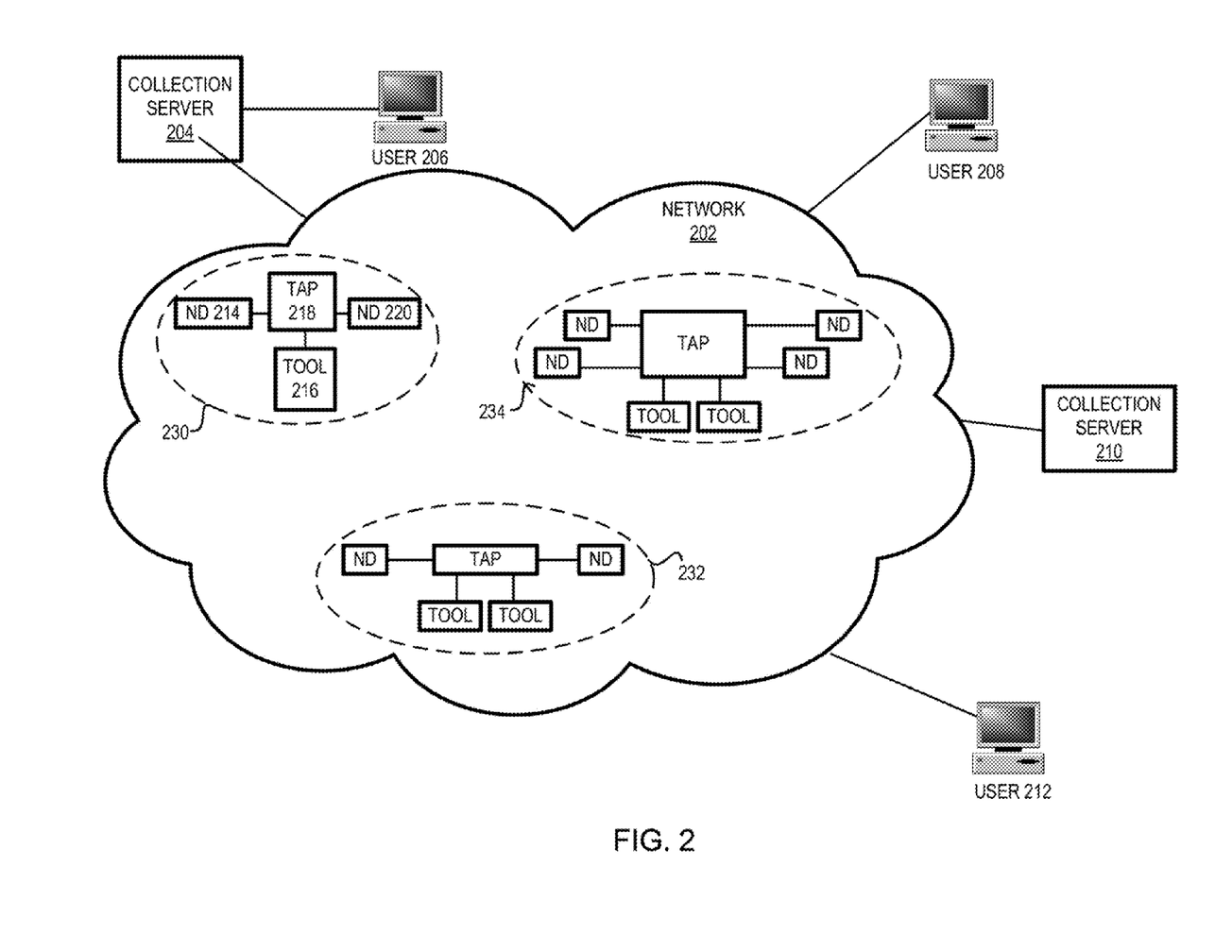
FIG. 2 shows, in an embodiment of the invention, an example of a data collection arrangement within a network environment.

FIG. 2 shows, in an embodiment of the invention, an example of a data collection arrangement within a network environment. Consider the situation wherein, for example, a company has a network environment 202 in which one or more network cluster arrangements (230, 232, 234, etc.) may exist. The complexity of the network cluster arrangement may vary. In an example, a simple network cluster arrangement (such as 230 and 232) may exist in which a single monitoring network appliance (such as network tap 218) may be employed to monitored data flowing between two network devices (such as 214 and 220). In a more complex network cluster arrangement (such as 234), a single monitoring network appliance may be employed to monitor data traffic flowing between multiple network devices. The monitored data may then be forwarded to a single monitoring tool (tool 216) or to multiple monitoring tools (such as those shown in network cluster arrangements 232 and 234).

The network cluster arrangements illustrated in FIG. 2 are example of different configurations that may exist. Other configurations may be established. The scope of the invention is not limited by the complexity of the network cluster arrangement.

Each monitoring network appliance may be configured to gather information about the data traffic flowing through each network cluster arrangement. In an embodiment, the information gathered may then be forwarded to a network data collection arrangement, such as collection server 204. In other words, a push data technique may be employed in which data is pushed to an external storage medium (such as the one that may be located at collection server 204). In an embodiment, the frequency at which the data may be forwarded onward may be predetermined. In an example, data may be forwarded every one second, for example.

In an embodiment, more than one network data collection arrangement may be employed to store the information about the data traffic. In an example, besides collection server 204, another collection server 210 may also be employed. In an embodiment, the data from a single network cluster arrangement may be stored in one or more network data collection arrangement. In an example, certain type of data (e.g., statistic data about network traffic collected by a traffic counter module) may be stored at collection server 204 while a different type of data (e.g., calculated statistical data) may be stored at collection server 210. In another example, statistic data collected on a first network device may be stored on collection server 204 while statistic data collected on a second network device may be stored on the other collection server 210). In yet another example, collection server 210 may be employed to provide redundancy. Redundancy may be employed if the data being gathered is considered as vital and the lost of the data may prove to be detrimental to the company.

In an embodiment, a network data collection arrangement may be physically connected to the network. In an example, collection server 204 is locally positioned within the company and shared a wired connection with the company's network. In another embodiment, a network data collection arrangement may be remotely connected to the network. In an example, collection server 210 may be geographically distant from the company's network. Instead, collection server 210 may be remotely connected through an Internet or Intranet connection.

Similar to the prior art, a user (such as user 206, user 208, and user 212) may request for the real-time data stored within a network cluster arrangement. As discussed herein after, a user may be a human user, a management tool, and the like. In an embodiment of the invention, the user is also able to access the archived data stored within one or more of the network data collection arrangement. In an example, user 206, a local user who has a wired connection to network 202, may request for data stored on collection server 204. In another embodiment, the data stored on the network data collection arrangements may also be accessed by remote users (such as users 208 and 212, for example). Regardless of the method for accessing the data stored on the network data collection arrangements, each user may be granted the same access to the data, given that each user has the same security access to the data.

Figure 3A:
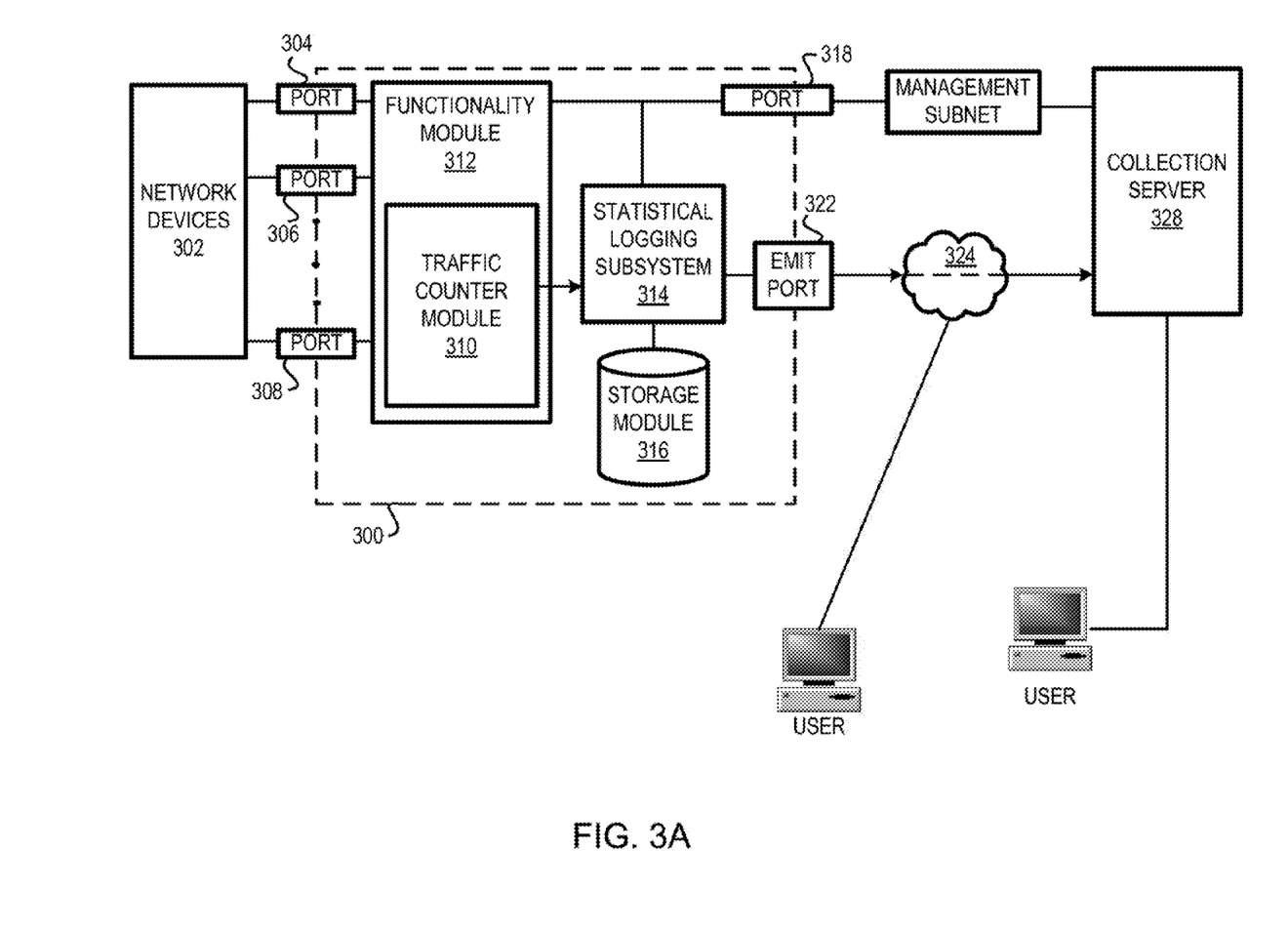
FIG. 3A shows, in an embodiment of the invention, a simple logistic diagram of a simple network environment.

FIG. 3A shows, in an embodiment of the invention, a simple logistic diagram of a simple network environment 324. Consider the situation wherein, for example, data is flowing between two network devices 302 (e.g., routers, switches, endpoints, etc.) are being monitored by a monitoring network appliance 300. In an example, the data traffic may flow from network device A to network device B via one of the data ports (304, 306, 308, etc.) of monitoring network appliance 300.

The data traffic flowing through monitoring network appliance 300 may be processed by a functionality module 312 before being forwarded to a monitoring tool. The processing capability of monitoring network appliance 300 may vary. In an example, functionality module 312 may be configured to perform switching and filtering. In another example, functionality module 312 may be configured to perform aggregation. In another example, a functionality module of a monitoring network appliance, such as a director device, may include a plurality of functionalities, including, but are not limited to, switching, filtering, aggregating, copying, and the like.

In addition, monitoring network appliance 300 may also include a traffic counter module 310, which may be configured to gather information about the data traffic flowing through monitoring network appliance 300. Information gathered may include, but are not limited to, the number of bytes, the number of packets, the packet size distribution, the packets with cyclic redundancy check (CRC) errors, the jumbo frames, the number of packets and bytes by protocol, the number of packets and bytes by talker/listener, the packets dropped, the oversized packets, and the like.

The data gathered by traffic counter module 310 may then be processed by a statistical logging subsystem 314. One of the functionality of statistical logging subsystem 314 may include performing statistical analysis (e.g., calculate average, mean, rates, and the like). Once the data has been processed, the data collected by traffic counter module and/or the statistical data calculated by statistical logging subsystem 314 may be stored within an internal storage module 316, such as a solid state memory component, a rotating memory component, and the like.

Given the high volume of statistical data about the data traffic that may be gathered and processed, storage module 316 may only store real-time data. In an example, data from the last five seconds may be stored locally at storage module 316. Unlike the prior art, the historical data is not lost. Instead, in an embodiment, the data collected by traffic counter module 310 and/or statistical data calculated by statistical logging subsystem 314 may be stored at an external location.

In an embodiment, a network data collection arrangement (such as collection server 328) may be employed to archive the data collected by traffic counter module 310 and/or calculated by statistical logging subsystem 314. In an example, the data collected and/or calculated by monitoring network appliance 300 may be forward through a push data technique to collection server 328. Although only one network data collection arrangement is shown, a network environment may include a plurality of network data collection arrangements.

In an embodiment, an emit port may be employed to push the data to collection server 328. The emit port may be a physical port such as emit port 322 or the emit port may be a logical port that may emit data through one of the management/console ports, such as port 318. The benefit of a dedicated emit port is that emit port 322 is not bogged down by traffic flow that may not be intended for a network data collection arrangement, such as collection server 328. As can be appreciated from the aforementioned, the number of emit ports may be depend upon a hardware limitation (such as physical space, for example).

In an embodiment, the data packets being transmitted to collection server may be transmitted on a predetermined time period. In a typical prior art arrangement, a user (such as human user, management tool, etc.) is usually able to send a request at about every one minute. The time limitation is partly due to the time required to send the request, to process the request and then to send the result back to the requester. As a result, a potential may exist for data to be lost even before the requester may request for the data.

Unlike the prior art, the push data technique may have a higher push through rate. Since the data packets may be scheduled to be pushed through without waiting for a request, the push through rate may be substantially shorter. In one embodiment, the data packets may be push through to a network data collection arrangement every one second, for example. As can be appreciated from the foregoing, the potential for data loss that may occur in the prior art is significantly eliminated.

Figure 3B:
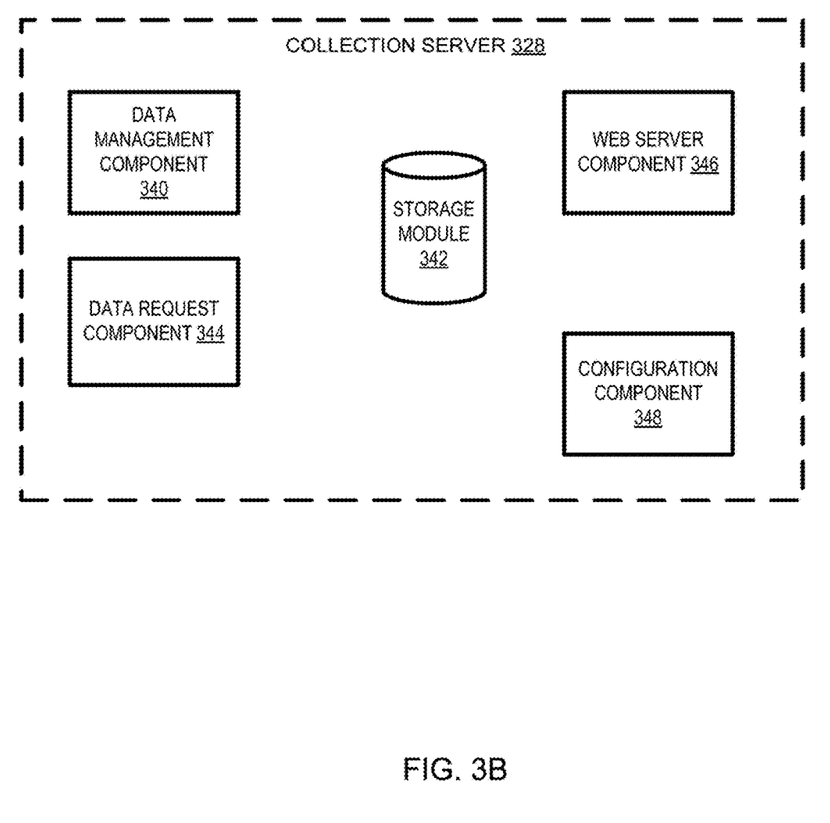
FIG. 3B shows, in an embodiment of the invention, a logical diagram of a network data collection arrangement.

In an embodiment, a network data collection arrangement (such as collection server 328) may be configured to manage the data collected by the monitoring network appliance. To facilitate discussion, FIG. 3B shows, in an embodiment of the invention, a block diagram of a network data collection arrangement, such as collection server 328. In an embodiment collection server 328 may include, but are not limited to, a data management component 340, a storage module 342, and a data request component 344.

In an embodiment, data management component 340 may be configured to receive the incoming data packets being sent by one or more monitoring network appliances. Upon receiving the data, data management component 340 may be configured to process the data packets. Processing may include indexing the data packets before storing the data within storage module 342. Additionally or alternatively, processing may include analyzing and/or aggregating data packets being received from multiple network appliances. In an embodiment, data management component 340 may also be configured to perform additional statistical analysis on the incoming data packets and/or the data stored within storage module 342.

In an embodiment, storage module 342 may include a database for storing statistical data about data traffic through a network. In an example, storage module 342 may be configured to store the data packets being received from one or more monitoring network appliances. As can be appreciated from the foregoing, the size of storage module 342 may vary depending upon the requirement of the network. In an embodiment, storage module 342 may also include an address database for storing address, such as an internet protocol (IP) address, specific to each monitoring network appliance.

In an embodiment, data request component 344 may be configured to manage data distribution and/or request. In some situation, a user (such as a human user, a management tool, and the like) may request for data stored. Although, the user may send a request to monitoring network appliance 300 to request for the real time data. In an embodiment, the user may send a request to a network data collection arrangement, such as collection server 328, to request for not only real-time data but also historical data.

Upon receiving the data request, data request component 344 may process the data request and retrieve the data requested from storage module 342. In an embodiment, web browser component 346 may be configured to provide a user interface for displaying the data to a user.

In another example, data request component 344 may be configured to handle scheduled data request. For example, a user may have a standing request for certain type of data to be sent to the user. The method of distribution may vary. Examples of distribution include, but are not limited to, email, web display, reports, and the like.

As aforementioned, a network data collection arrangement, such as collection server 328, may be configured to receive data packets from one or more monitoring network appliances (such as shown in FIG. 2). In an embodiment, collection server 328 may include a configuration component 348, which may be employed to provide an integrated solution for managing the different devices (e.g., monitoring network appliances) within the network. In an example, each monitoring network appliance may be customized using collection server 328 instead of having to accessing each individual monitoring network appliance. In another example, common customization may be deployed at a single location (via collection server 328, for example) instead of having to deploy the change via each monitoring network appliance.

To protect each network cluster arrangement (as shown in FIG. 2), the IP address of each monitoring network appliance may be hidden from the network data collection arrangement. In other words, instead of the actual IP address being included in each data packet, a unique "fake address" may be employed for each monitoring network appliance. By using a fake address, each monitoring network appliance is protected while the network data collection arrangement is still provided with a unique identifier for organizing the data.

As can be appreciated from FIG. 3A and FIG. 3B, an integrated solution is provided for storing and archiving statistical data about traffic flow through the network. Unlike the prior art, the push data technique does not place the burden of pulling the data on the external user. In other words, a user is not required to stay abreast of new devices that may join the network. Instead, the user may query the network data collection arrangement to request for the data required. In an example, the user may request for a type of data without having to specify the specific device. In another example, the user is no longer required to send a plurality of data requests to a plurality of monitoring network appliances to gather the required data. Since the network data collection arrangement provides an integrated solution, the user may send a query to a single location to request for the required data.

As aforementioned, data traffic may be emitted to a network data collection arrangement. However, before emitting the data traffic, the data collected by a traffic module and/or by statistical logging subsystem may be encapsulated into format that is transportable by a communication protocol, such as a user datagram protocol (UDP). The type of communication protocol that may be employed may be dependent upon the configuration of a network data collection arrangement. In an example, if a network data collection arrangement has a secured feature that prevent the network data collection arrangement from knowing the true address of a device, UDP may be employed since an acknowledgement is not required each time a data packet is sent. However, if the network data collection arrangement does not include a secure feature that protect the true address of a device, then other communication protocol, such as transmission control protocol (TCP), may also be employed.

To facilitate discussion, consider the situation wherein, for example, data is being emitted as a UDP data packet. Each data packet may be configured based on predefined parameters. In an embodiment, the parameters may be user configurable. Examples of configurable parameters may include, but are not limited to, emit_interval, emit_mtu, emit_columns, and servers.

As discussed herein, emit_interval refers to the number of seconds between statistical emissions.

As discussed herein, emit_mtu refers to the maximum transmission unit size in bytes for an emitted data packet. In other words, multiple data packets may be employed to carry large packet payload.

As discussed herein, emit_columns refers to the number of data points that is included in each data packet. In an example, if emit_columns is equal to one than one data point is sent in a data packet. In another example, if emit_columns is equal to two than the current data point and the previous data point may be sent in a data packet. The parameter emit_columns provides a redundancy mechanism in that if a data packet is loss, a network data collection arrangement may compare the incoming data packet against its database to determine if a data point has previously been dropped.

As discussed herein, the parameter servers refers to one or more network data collection arrangement that may be configured to receive the data packet. In an example, if the parameter has designated both collection servers 204 and 210 (of FIG. 2) to receive the data packet, then each data packet is sent to each collection server. The parameter servers may include the address and/or port for each of the collection server.

Figure 4A:
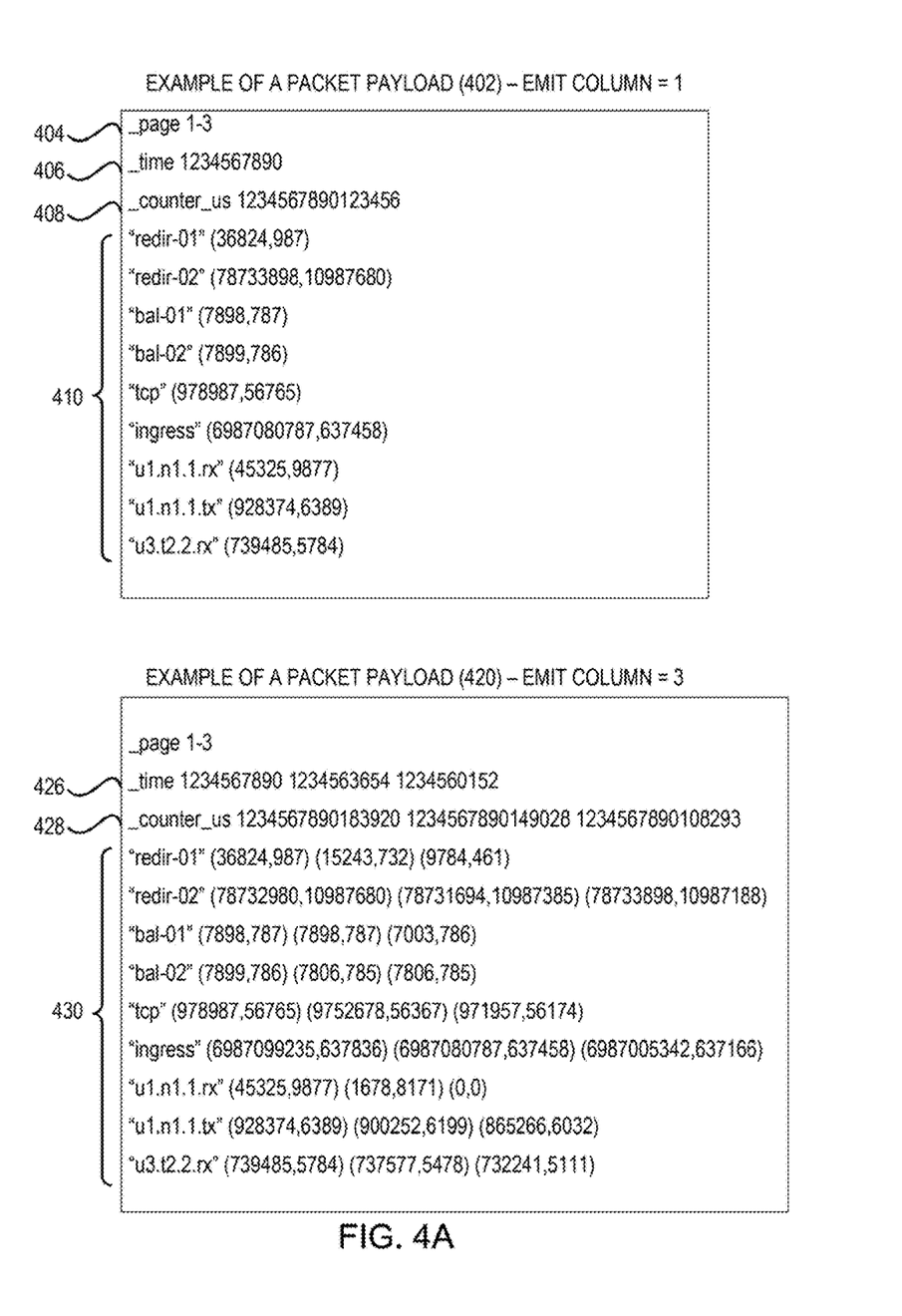
FIG. 4A shows, in an embodiment of the invention, examples of UDP packet payloads.

FIG. 4A shows, in an embodiment of the invention, examples of UDP packet payloads. FIG. 4A will be discussed in relation to FIG. 4B, which shows, in an embodiment of the invention, a table explaining each line header in the UDP data packet payload example. The payload of each UDP packet may be an ASCII text string, in an embodiment, consisting of multiple lines.

A sample packet payload (such as packet payload 402) may include the following line headers: _page, _time, _counter_us, and "channel name".

Figure 4B:
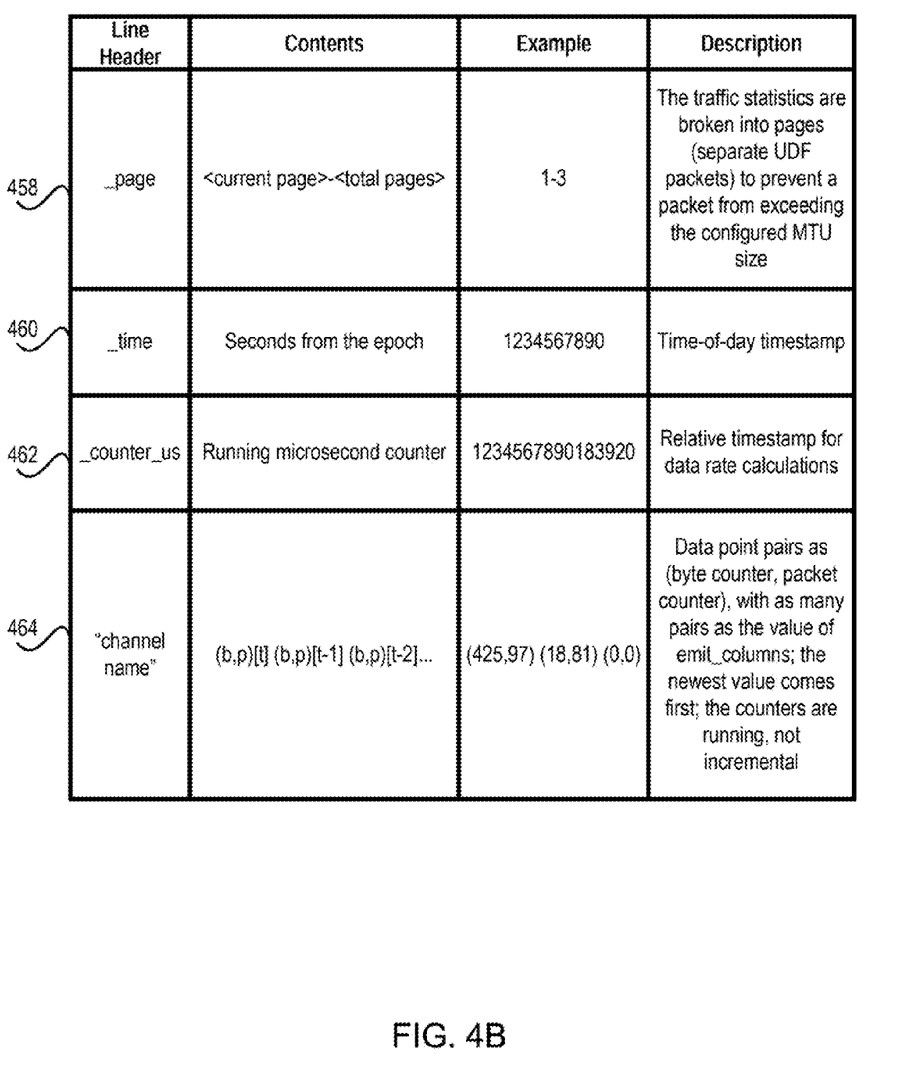
FIG. 4B shows, in an embodiment of the invention, a table explaining each of the line headers in the UDP data packet payload example.

Since data traffic may be broken into separate data packets (pages) in order to prevent the data packet from exceeding the maximum transmission unit (parameter emit mtu), the line header _page (458) is employed to indicate the current page (packet) and the total number of pages (i.e., packets). In an example, line item 404 of data packet payload 402 indicates that the line header _page is 1-3. In other words, the current data packet is the first data packet out of three total data packets.

In an embodiment, a packet payload may also include a line header _time (460). Line header _time may be the number of seconds since the epoch. In an example, line item 406 shows a _time of 1234567890. With the line header _time, date and time of the data packet payload may be calculated.

In an embodiment, a packet payload may also include a line header _counter_us (462), which is a relative timestamp that may be employed to perform data rate calculations. The line header _counter_us usually is a microsecond counter. In an example, line item 408 shows a counter_us of 1234567890123456. Using the line header _counter_us, a network data collection arrangement may determine the relative amount of time that may have passed (relative time interval) between data packet received. Thus, if the number of microseconds is greater than the parameter emit_interval, then a data packet may have been dropped. In an embodiment, a data/utilization rate may be determined by dividing the relative time interval by the difference in the number of bytes from the current data packet and the previous data packet.

In an embodiment, the data packet payload may also include line header "channel name" (464). As discussed herein, "channel name" refers to the name of the data point being emitted. The number of "channel names" that may be transmitted may vary. However, each "channel name" may include at least one data point pair in which the first value is the byte counter value and the second value is the packet counter value.

Bracket group 410 of packet data payload 402 shows different examples of "channel names". In an example, "redir_01" refers to a channel source with the name redir_01. In another example, "bal_01" refers to a first load balancer out channel. In yet another example, "ul.nl.l.rx" refers to a specific port. As can be appreciated from the foregoing, the "channel name" may refer to the source of each data points.

In an embodiment, a data packet payload may include more than one data point. In an example, packet payload 420 shows an example of a packet payload with a parameter emit_column of 3. In other words, each line header (except for line header _page) may include up to three data points (the current data point and the previous two data points). In an embodiment, the data points are in the order of latest to oldest. In an example, line item 426 includes three timestamp for _time. Similarly, line item 428 and bracket group 430 also include three data point for each of the line item. In this example, a redundancy mechanism is provided. Thus, if any data packet has been dropped, the potential for data loss is less than if the parameter emit_column is less than three since each data packet include current and past data values.

Figure 5:
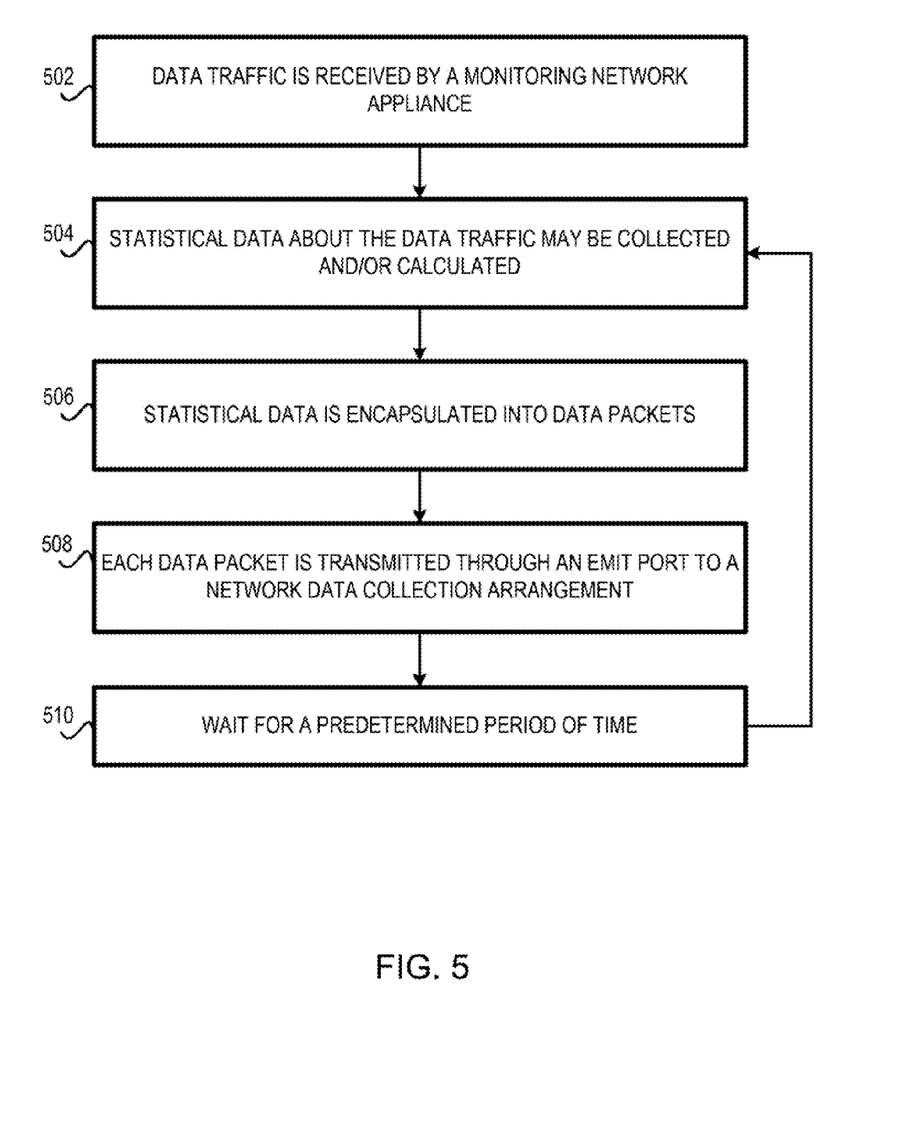
FIG. 5 shows, in an embodiment of the invention, a simple flow diagram illustrating a method for transmitting traffic statistics to a network data collection arrangement.

FIG. 5 shows, in an embodiment of the invention, a simple flow diagram illustrating a method for transmitting traffic statistics to a network data collection arrangement.

At a first step 502, data traffic is received by a monitoring network appliance. Consider the situation wherein, for example, data is flowing between two network devices (such as routers, switches, and the like). To monitor the data traffic, a monitoring network appliance may be employ.

At a next step 504, statistical data about the data traffic may be collected and/or calculated. Besides copying the data traffic and forwarding at least a portion of the data traffic to one or more monitoring tools, the monitoring network appliance may also be collecting statistical data (via a traffic counter module) and/or performing statistical analysis (via a statistical logging subsystem). The type of statistical being collected may include, but are not limited to, number of bytes/packets being received, number of bytes/packets being transmitted, number of packets, number of bytes/packets received/transmitted on each channel, number of bytes/packets matching all configured filter conditions, number of bytes/packets by protocol, and the like. The type of statistical data being calculated may include, but are not limited to, average, mean, minimum, maximum, rates, and other simple statistical analysis.

At a next step 506, the statistical data is encapsulated into data packets. The method of encapsulation may depend upon the communication protocol (e.g., UDP, TCP, etc.) being employed. In an embodiment, the encapsulation may be performed by the statistical logging subsystem. To encapsulate the data, the system may check the parameters associated with the monitoring network appliance.

In an example, if a data packet is going to exceed the parameter emit_mtu (which define the maximum transmission unit in bytes), then the data packet may be broken up into multiple data packets. To connect the data packets, the line header _page may be employed to indicate the current page (packet) and the total number of pages (packets).

In another example, the parameter emit_columns may equal to two. In other words, the data packet may include two set of data point values. The first data point value for each line header is the most current data value. The second data point value is the previous data point value. The value of the parameter emit_columns may depend upon the critical nature of the statistical data. For example, if the company deems that loss of a few data packets is acceptable, then the parameter emit_columns may be set to a low value. However, if the company deems that all data packet is critical, then the parameter emit_columns may be set to a higher value.

At a next step 508, each data packet is transmitted out through an emit port to a network data collection arrangement. In an embodiment, the emit port may be an actual physical port dedicated to emitting data packets. In another embodiment, the emit port may be a logical port of a non-dedicated port. In an example, the actual existence of a physical emit port may be restricted due to hardware limitation. In this example, the data packets may still be emitted by overlaying a logical emit port over a currently existing port (such as a management and/or console port).

In an embodiment, a data packet may be emitted more than once. The frequency of the emitting may depend upon the destination of the data packets. For example, if the parameter servers has only one IP address, then the data packet is only transmitted to network data collection arrangement. However, if more than one IP addresses are associated with the parameter servers, then the data packet is emitted to each of the IP addresses associated with the parameter servers.

At a next step 510, the system may wait for a predetermined period of time before repeating returning to step 404. The predetermined period of time may be user configurable, in an embodiment. In an example, if the parameter emit_interval is set to 1 second, then the system will wait for one second before sending the next set of data packets.

Figure 6:
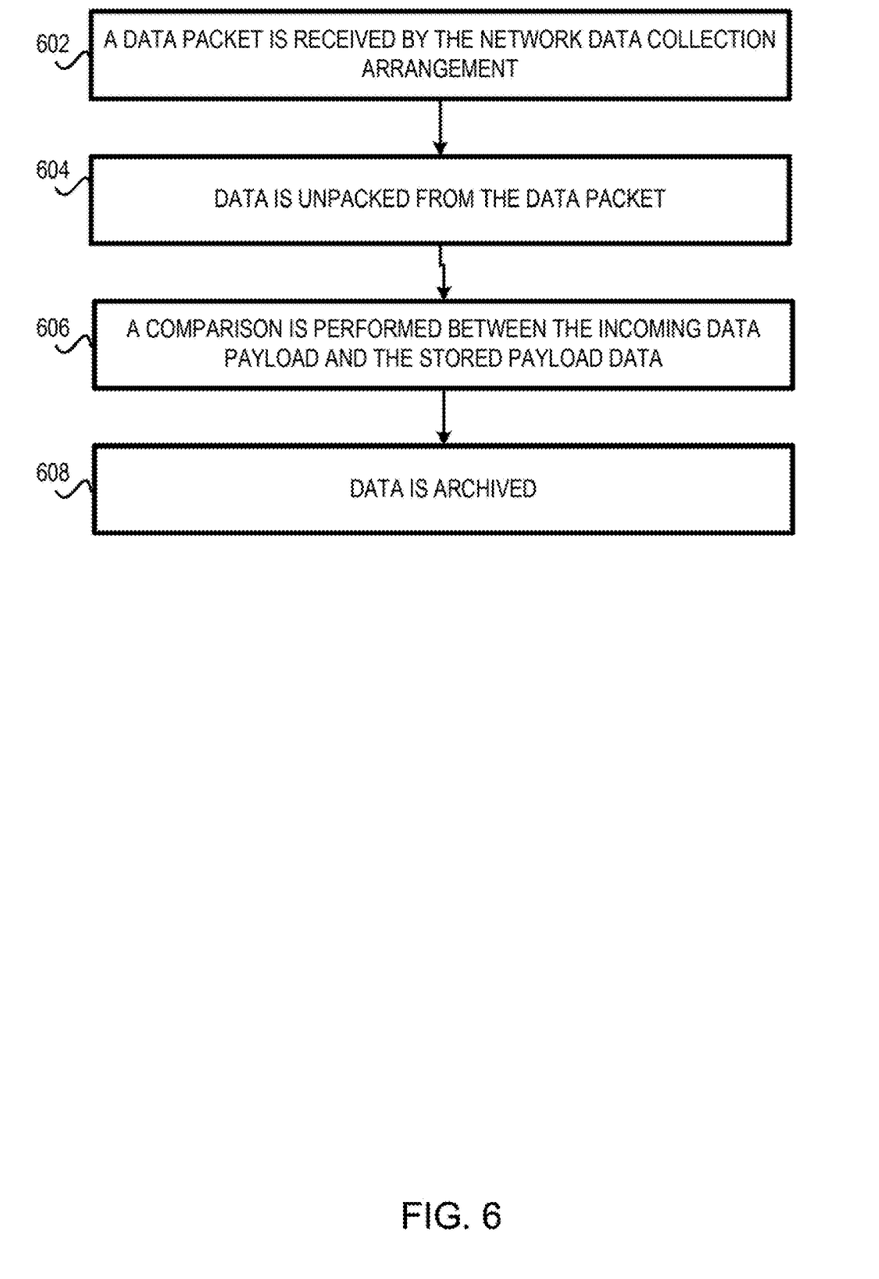
FIG. 6 show, in an embodiment of the invention, a simple flow diagram illustrating a method for managing incoming data packets from transmitting traffic statistics to a network data collection arrangement.

FIG. 6 show, in an embodiment of the invention, a simple flow diagram illustrating a method for managing incoming data packets incorporating data values about network traffic to a network data collection arrangement.

At a first step 602, data packet is received from a monitoring network appliance. As aforementioned, the data packet may be coming from one or more devices within a network capable of collecting statistical data, such as monitoring network appliances.

At a next step 604, the data packet is unpacked. In an example, data management component 340 may be configured to unpack the data from the data packets.

At a next step 606, a comparison may be made between the current payload data against the stored payload data. This comparison is especially useful in a redundant environment. In an example, a company may have set the parameter emit_columns to be equaled to three. This means that each payload data may include up to three data points for each line header (the current data point and the previous two data points). By looking at the timestamp, the network data collection arrangement may determine if any of the previous data point on the current payload is not currently being stored in the database. If no data point is missing, then the old data point values are discarded, in an embodiment. However, if a data point is determined to be missing, the data point may be pulled from the payload to be archived. This step is optional and may not need to be performed if a redundancy mechanism is active.

At a next step 608, the data is archived. In an example, the data may be saved to a database within storage module 342. Given that data may be coming from a plurality of devices, the payload data may include identifier(s) that may enable the network data collection arrangement to identify the source of the payload data.

Figure 7:
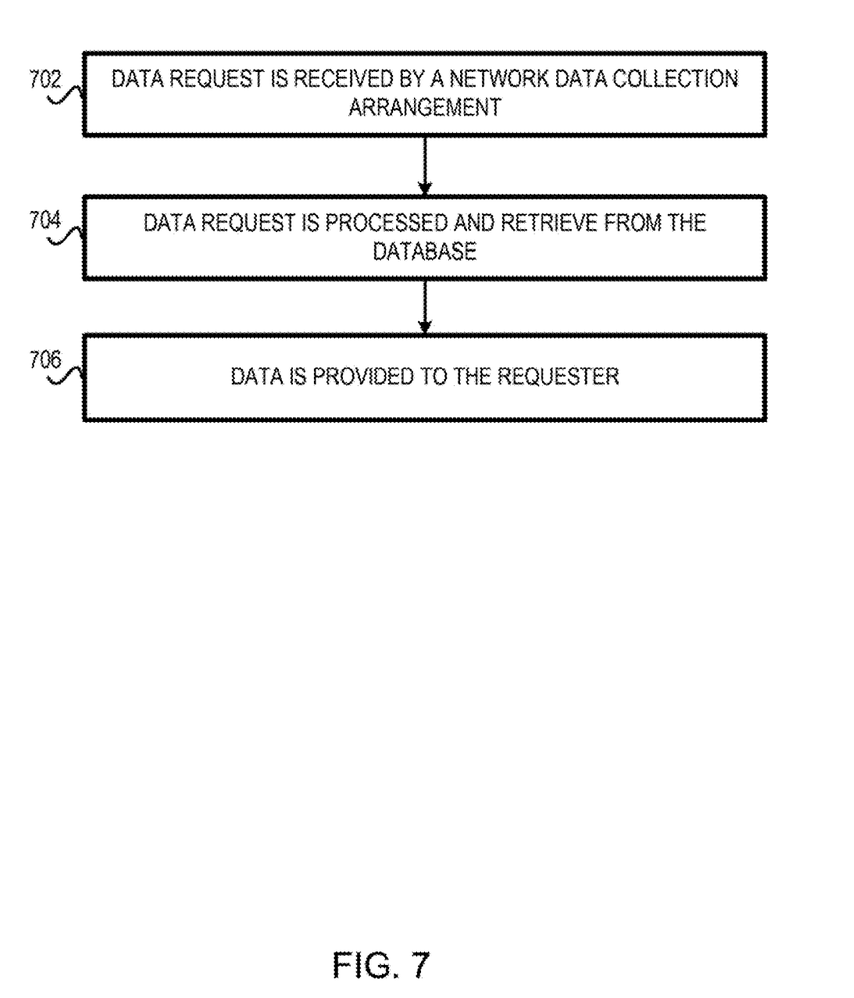
FIG. 7 shows, in an embodiment of the invention, a simple flow chart illustrating a method for handling data request.

FIG. 7 shows, in an embodiment of the invention, a simple flow chart illustrating a method for handling data request.

At a first step 702, a data request is received by a network data collection arrangement. Consider the situation wherein, for example, a user wants to retrieve statistical data about a specific monitoring network appliance for the last seven days. The user request may be received by a web server component.

At a next step 704, the data request is processed. In an example, a component of the network data collection arrangement, such as data request component 344, may handle the request. In an embodiment, the network data collection arrangement may retrieve the data stored within the storage module.

At a next step 706, the data is provided to the requester. The method of transmitting the data to the requester may vary. In an example, the data may be provided via an email. In another example, the data may be embedded into a web page and be visually provided to the requester. In an embodiment, the data may be presented as characters. In another embodiment, the data may be display using rich graphics.

As can be appreciated from one or more embodiments of the present invention, a network data collection arrangement and methods are provided for storing and managing statistical data about network data traffic. By storing the statistical data about network traffic at a centralized location, real-time and/or historical may be made available for analysis. With a centralized storage location, correlation may be performed between the various data streams. With access to archived data, troubleshooting may be performed in a more timely manner in order to provide corrective action.

While this invention has been described in terms of several preferred embodiments, there are alterations, permutations, and equivalents, which fall within the scope of this invention. Although various examples are provided herein, it is intended that these examples be illustrative and not limiting with respect to the invention. It should also be noted that there are many alternative ways of implementing the methods and apparatuses of the present invention. Also, the title is provided herein for convenience and should not be used to construe the scope of the claims herein. If the term "set" is employed herein, such term is intended to have its commonly understood mathematical meaning to cover zero, one, or more than one member. Furthermore, embodiments of the present invention may find utility in other applications. The abstract section is provided herein for convenience and, due to word count limitation, is accordingly written for reading convenience and should not be employed to limit the scope of the claims. It is therefore intended that the following appended claims be interpreted as including all such alterations, permutations, and equivalents as fall within the true spirit and scope of the present invention.

What is claimed is:

1. A system for monitoring data pertaining to network data traffic flowing through a network and for pushing updates in the data, the system comprising:
   a set of network cluster arrangements, wherein each network cluster arrangement of said set of network cluster arrangements includes:
   a set of monitoring network appliances, each including a programmable circuit and a memory and configured for monitoring at least a portion of said network data traffic flowing between a plurality of network devices, the network devices including switches or routers and the monitoring network appliances being separate from the switches or routers, each monitoring network appliance including at least one data port for forwarding traffic between the switches or routers and an emit port separate from the at least one data port; and
   at least one data collection server configured for at least storing said data pertaining to said network data traffic, said at least one data collection server including: a processor and a memory executing:
      a data management component configured at least for receiving said set of data packets from each one of said set of monitoring network appliances,
      a storage module for storing at least a portion of said set of data packets, and a data request component, wherein the at least one data collection server is coupled to the emit port, and wherein the emit port is dedicated to transmit the monitored portion of the data traffic to the at least one data collection server using a data push model by periodically pushing an update of the monitored portion of the data traffic at a scheduled frequency to the at least one data collection server, wherein the at least one data collection server sends a single query for a type of data to the set of monitoring network appliances without specifying a device being monitored and wherein the set of monitoring network appliances automatically pushes the updates to said at least one data collection server via the emit port, wherein the updates include monitored data from devices that join a network after transmission of the single query to the set of monitoring network appliances;
   wherein said at least one data collection server is configured for, after receiving said set of data packets from said set of monitoring network appliances:
      unpacking said set of data packets;
      comparing payload data within said set of data packets with payload data stored by said network at least one data collection server, wherein said comparing includes comparing one or more timestamp values in said payload data within said set of data packets with one or more timestamp values in said stored payload data; and
      if a portion of said payload data is missing from said stored payload data, retrieving said portion of said payload data from said set of data packets and storing said portion of said payload data within said network data cluster arrangement.

2. The system of claim 1 wherein said each network cluster arrangement further includes a set of monitoring tools configured for receiving a copy of said network data traffic monitored by said set of monitoring network appliances.

3. The system of claim 2 wherein each monitoring network appliance of said set of monitoring network appliances includes a functionality module configured at least for processing said network data traffic, wherein said processing includes at least one of switching, filtering, aggregation, and copying.

4. The system of claim 3 wherein said each monitoring network appliance includes a traffic counter module configured at least for gathering information pertaining to said network data traffic, wherein said information includes at least one of a number of bytes, a number of packets, a packet size distribution, a number of packets with cyclic redundancy check errors, a number of jumbo frames, a number of packets and bytes by protocol, a number of packets dropped, a number of oversized packets, a number of packets and bytes by talker, and a number of packets and bytes by listener.

5. The system of claim 4 wherein said each monitoring network appliance includes a statistical logging subsystem configured at least for calculating statistical data, said statistical data including at least one of average, mean, rates, and standard deviation.

6. The system of claim 5 wherein said each monitoring network appliance includes an internal storage module configured for storing real-time data collected by said each monitoring network appliance.

7. The system of claim 6 wherein at least one of said information gathered by said traffic counter module and statistical data calculated by said statistical logging subsystem is encapsulated into said set of data packets.

8. The system of claim 1 wherein said emit port is a physical port.

9. The system of claim 1 wherein said emit port is a logical port and wherein said logical port is one of a management port and a console port.

10. The system of claim 1 wherein said set of data packets received by said at least one data collection server is transmitted to said at least one data collection server on a predetermined time period shorter than a time period required for sending a request to the set of monitoring network appliances, processing the request and sending a result to said at least one data collection server.

11. The system of claim 1 wherein said data management component is configured for processing said set of data packets and wherein said processing includes at least one of storing said set of data packets within said storage module, analyzing said set of data packets, aggregating said set of data packets, and performing statistical analysis.

12. The system of claim 11 wherein said storage module includes an address database for storing a plurality of addresses, wherein each address of said plurality of addresses is specific to one of said monitoring network appliances.

13. The system of claim 12 wherein said data request component is configured at least for managing one of data requests and data distribution for said stored portion of said data packets.

14. The system of claim 13 wherein an internet protocol address for said each monitoring network appliance of said set of monitoring network appliances is replaced by unique identifier in said set of data packets received by said at least one network data collection server.

15. The system of claim 1 wherein each data collection server of said set of data collection servers includes a configuration component for providing an integrated solution for managing a plurality of devices connected to said network.

16. A method for monitoring data pertaining to network data traffic flowing through a network and for pushing updates in the data, the method comprising:

at a monitoring network appliance including a programmable circuit and a memory:
  receiving said network data traffic flowing between at least two network devices, the at least two network devices each comprising a switch or a router and the monitoring network appliance being separate from the switch or router;
  copying at least a portion of said network data traffic by the monitoring network appliance;
  collecting at least one of traffic data and statistical data pertaining to said network data traffic;
  encapsulating at least one of said traffic data and said statistical data into a set of data packets; and
  transmitting said set of data packets to a data collection server, at said data collection server:
  receiving, by a data management component of said data collection server, said set of data packets from said monitoring network appliance, and
  storing, by a storage module of said data collection server, at least a portion of said set of data packets,
  wherein transmitting said copied portion of said network data traffic to said data collection server includes using a data push model by periodically pushing an update of the copied portion of said data traffic at a scheduled frequency to said data collection server, wherein said data collection server sends a single query for a type of data to said monitoring network appliance without specifying a device being monitored and wherein said monitoring network appliance automatically pushes the updates to said data collection server via an emit port, wherein the updates include monitored data from devices that join a network after transmission of the single query to the monitoring network appliance;
at said data collection server, after receiving said set of data packets from said monitoring network appliance;
  unpacking said set of data packets;
  comparing payload data within said set of data packets with stored payload data stored within said data collection server, wherein said comparing includes comparing one or more timestamp values in said payload data within said set of data packets with one or more timestamp values in said stored payload data; and
  if a portion of said payload data is missing from said stored payload data, retrieving said portion of said payload data from said set of data packets and storing said portion of said payload data within said network data collection arrangement.

* * * * *